(12) United States Patent
Bouchard et al.

(10) Patent No.: US 11,585,076 B2
(45) Date of Patent: Feb. 21, 2023

(54) APPARATUS AND METHOD FOR VALVE CARTRIDGE EXTRACTION

(71) Applicant: Watts Regulator Co., North Andover, MA (US)

(72) Inventors: Peter P. Bouchard, Ayer, MA (US); Jason Doughty, Fitchburg, MA (US)

(73) Assignee: Watts Regulator Co., North Andover, MA (US)

(*) Notice: Subject to any disclaimer, the term of this patent is extended or adjusted under 35 U.S.C. 154(b) by 526 days.

(21) Appl. No.: 16/752,297

(22) Filed: Jan. 24, 2020

(65) Prior Publication Data

US 2021/0230850 A1    Jul. 29, 2021

(51) Int. Cl.
*E03C 1/10* (2006.01)
*E03F 7/04* (2006.01)
(Continued)

(52) U.S. Cl.
CPC .............. *E03C 1/104* (2013.01); *E03B 7/09* (2013.01); *E03F 7/04* (2013.01); *F16K 43/00* (2013.01); *B25B 27/24* (2013.01); *E03B 7/077* (2013.01); *F16K 2200/501* (2021.08); *Y10T 137/6065* (2015.04); *Y10T 137/6086* (2015.04); *Y10T 137/6109* (2015.04); *Y10T 137/6154* (2015.04)

(58) Field of Classification Search
CPC .... E03B 7/09; E03B 7/077; E03F 7/04; E03F 7/02; F16K 43/00; F16K 2200/501; F16K 2200/50–502; F16K 27/0209; E03C 1/104–108; Y10T 137/6109; Y10T 137/6086; Y10T 137/6065; Y10T 137/6011–6021; Y10T 137/6154; Y10T 137/6157; Y10T 137/7837–7939; Y10T 137/6113; B25B 27/24
USPC ......... 137/270, 315.11–315.14, 315.33, 327, 137/328, 511–543.23; 29/221.6
See application file for complete search history.

(56) References Cited

U.S. PATENT DOCUMENTS

| | | |
|---|---|---|
| 213,394 A | 3/1879 | Cornwal |
| 2,310,586 A | 2/1943 | Lohman |

(Continued)

FOREIGN PATENT DOCUMENTS

| | | |
|---|---|---|
| CN | 110081212 A | 8/2019 |
| DE | 1925477 U | 12/1970 |

(Continued)

OTHER PUBLICATIONS

Lead Free Master Series LF870V product specifications pages, ES-F-LF-870V 1826, 2018, 4 pages.

(Continued)

*Primary Examiner* — Craig J Price
(74) *Attorney, Agent, or Firm* — Day Pitney LLP; George N. Chacias

(57) ABSTRACT

An apparatus and method for valve cartridge extraction from a valve assembly, wherein the assembly includes a valve member body, a cartridge, and a valve cartridge extraction (VCE) tool comprising at least one pin disposed on the upper surface of the VCE tool. During cartridge removal, the VCE tool is uncoupled from the valve member body and is coupled to the cartridge with the at least one pin. The cartridge is rotated with the coupled VCE tool to assist in cartridge removal. The valve assembly may also include a hood covering the VCE tool.

30 Claims, 13 Drawing Sheets

(51) Int. Cl.
| | |
|---|---|
| *E03B 7/09* | (2006.01) |
| *F16K 43/00* | (2006.01) |
| E03B 7/07 | (2006.01) |
| B25B 27/24 | (2006.01) |

(56) References Cited

U.S. PATENT DOCUMENTS

| | | | |
|---|---|---|---|
| 2,827,921 | A | 3/1958 | Sherman et al. |
| 3,173,439 | A | 3/1965 | Griswold et al. |
| 3,189,037 | A | 6/1965 | Modesto |
| 3,429,291 | A | 2/1969 | Hoffman |
| 3,837,357 | A | 9/1974 | Slaughter |
| 3,837,358 | A | 9/1974 | Zieg et al. |
| 3,859,619 | A | 1/1975 | Ishihara et al. |
| 3,896,850 | A | 7/1975 | Waltrip |
| 3,996,962 | A | 12/1976 | Sutherland |
| 4,014,284 | A | 3/1977 | Read |
| 4,244,392 | A | 1/1981 | Griswold |
| 4,416,211 | A | 11/1983 | Hoffman |
| 4,489,746 | A | 12/1984 | Daghe et al. |
| 4,523,476 | A | 6/1985 | Larner |
| 4,618,824 | A | 10/1986 | Magee et al. |
| 4,667,697 | A | 5/1987 | Crawford |
| 4,777,979 | A | 10/1988 | Twerdochlib |
| 4,920,802 | A | 5/1990 | McMullin et al. |
| 4,945,940 | A | 8/1990 | Stevens |
| 5,008,841 | A | 4/1991 | McElroy |
| 5,024,469 | A | 6/1991 | Aitken et al. |
| 5,125,429 | A | 6/1992 | Ackroyd et al. |
| 5,236,009 | A | 8/1993 | Ackroyd |
| 5,287,874 | A * | 2/1994 | Dixon ............... F16K 35/10 137/382 |
| 5,404,905 | A | 4/1995 | Lauria |
| 5,425,393 | A | 6/1995 | Everett |
| 5,520,367 | A | 5/1996 | Stowers |
| 5,551,473 | A | 9/1996 | Lin et al. |
| 5,566,704 | A | 10/1996 | Ackroyd et al. |
| 5,597,010 | A * | 1/1997 | Hoffman ............ F16K 27/08 137/381 |
| 5,669,405 | A | 9/1997 | Engelmann |
| 5,713,240 | A | 2/1998 | Engelmann |
| 5,901,735 | A | 5/1999 | Breda |
| 6,062,787 | A * | 5/2000 | Maddalena .......... F16B 41/005 411/432 |
| 6,123,095 | A | 9/2000 | Kersten et al. |
| 6,170,510 | B1 | 1/2001 | King et al. |
| 6,343,618 | B1 | 2/2002 | Britt et al. |
| 6,349,736 | B1 | 2/2002 | Dunmire |
| 6,374,849 | B1 | 4/2002 | Howell |
| 6,471,249 | B1 | 10/2002 | Lewis |
| 6,513,543 | B1 | 2/2003 | Noll et al. |
| 6,581,626 | B2 | 6/2003 | Noll et al. |
| 6,659,126 | B2 | 12/2003 | Dunmire et al. |
| 6,675,110 | B2 | 1/2004 | Engelmann |
| 7,506,395 | B2 | 3/2009 | Eldridge |
| 7,934,515 | B1 | 5/2011 | Towsley et al. |
| 8,220,839 | B2 | 7/2012 | Hall |
| 8,997,772 | B2 | 4/2015 | Noll et al. |
| 9,091,360 | B2 | 7/2015 | Frahm |
| 9,239,072 | B1 * | 1/2016 | Andersen ............. F16K 5/06 |
| 9,546,475 | B2 | 1/2017 | Lu |
| 9,995,605 | B2 | 6/2018 | Konno et al. |
| 10,132,425 | B2 | 11/2018 | Di Monte |
| 10,561,874 | B2 | 2/2020 | Williams et al. |
| 10,719,904 | B2 | 7/2020 | Yasumuro et al. |
| 10,883,893 | B2 | 1/2021 | Shaw et al. |
| 10,914,412 | B2 | 2/2021 | Doughty et al. |
| 10,962,143 | B2 | 3/2021 | Cis et al. |
| 2003/0000577 | A1 | 1/2003 | Noll et al. |
| 2004/0045604 | A1 | 3/2004 | Dunmire et al. |
| 2004/0107993 | A1 | 6/2004 | Stephens |
| 2005/0092364 | A1 | 5/2005 | Furuya et al. |
| 2005/0199291 | A1 | 9/2005 | Price et al. |
| 2006/0196542 | A1 | 9/2006 | Yen |
| 2007/0181191 | A1 | 8/2007 | Wittig et al. |
| 2007/0193633 | A1 | 8/2007 | Howell et al. |
| 2007/0240765 | A1 | 10/2007 | Katzman et al. |
| 2008/0289567 | A1 | 11/2008 | Gordon |
| 2009/0194719 | A1 | 8/2009 | Mulligan |
| 2012/0102702 | A1 * | 5/2012 | Mitchell ............. E03B 7/077 29/426.1 |
| 2017/0023141 | A1 | 1/2017 | Andersson |
| 2019/0043157 | A1 | 2/2019 | Yasumuro et al. |
| 2019/0162341 | A1 | 5/2019 | Chiproot |
| 2019/0323618 | A1 | 10/2019 | Fletcher et al. |
| 2020/0141612 | A1 | 5/2020 | Thibodeaux |
| 2021/0172157 | A1 | 6/2021 | Burke et al. |
| 2021/0230850 | A1 | 7/2021 | Bouchard et al. |

FOREIGN PATENT DOCUMENTS

| | | | |
|---|---|---|---|
| DE | 3525261 | U1 | 11/1985 |
| DE | 202014102568 | U1 * | 10/2015 ............... E03C 1/10 |
| JP | 2002213629 | A | 7/2002 |
| WO | 2003060459 | A1 | 7/2003 |
| WO | 2020023584 | A1 | 1/2020 |

OTHER PUBLICATIONS

Watt TK-99E Backflow Preventer Test Kit Product Specifications and Test Information, IS-TK99E 0829, 2009, 4 pages.
Zurn Wilkins 300AR Series, Backflow Preventer Order Form No. 480-060, Apr. 2017, 2 pages.
Watts Water Technologies Company, Installation, Maintenance & Repair Series 909, LF909, 909RPDA, LF909RPDA, 2016, 8 pages.
Watts Water Company, Series 909RPDA for Health Hazard Applications, 2016, 4 pages.
Watts Regulator Co., Watts ACV 113-6RFP Flood Protection Shutdown Valve for Health Hazard Applications, 2020, 4 pages.
European Search Report for European Patent Application No. 20192133.5 dated Feb. 1, 2021, 9 pages.
Ames Fire & Waterworks, division of Watts Industries, F-A-Spools/Flanges, 2001, 4 pages.
Watts, S-RetroFit-Simple, 2017, 2 pages.
*Zurn Industries, LLC* vs. *Conbraco Industries, Inc.*, Complaint for patent infringement, United States District Court for the Center District of California Western Division, Case No_ 2.16-CV-5656, Jul. 29, 2016; 5 pages.
Wilkins Company, Model 375/475MS Series, Installation, Maintenance and Instruction Sheet, 2006, 1 page.
Watts, "Double Check Valve Assembly Backflow Preventers, Bronze," Article 1, 2021, 6 pages.
Watts, "Reduced Pressure Zone Assembly Backflow Preventers, Bronze Body, Sizes 1/4-2 IN," Article 1, 2021, 16 pages.
Miscellaneous Communication issued in European patent application No. 20211811.3, dated Apr. 5, 2021, 8 pages.
Office Action issued in corresponding Chinese patent application No. 20201920527.3, dated Mar. 10, 2021, 1 page (translation unavailable).
International Search Report and Written Opinion issued in corresponding international patent application No. PCT/US2021/046208, dated Dec. 1, 2021, 8 pages.
Appolo Valves PVB4A Series Installation, Operation and Maintenance Manual for Model PVB4A 1/2"-2" Pressure Vacuum Breaker Backflow Preventer, dated Jan. 11, 2012, 12 pages.
Apollo Valves PVB4A Series Installation, Operation, and Maintenance Manual, copyright May 2009, 9 pages.
Watts Water Technologies Company Brochure ES LF800M4QT for Health Hazard Applications Lead Free Series LF8 M4QT Anti-Siphon Vacuum Breakers Sizes 1/2"-2", copyright 2013, 4 pages.
Conbraco BFMMPVB Maintenance Manual for Series 4V-500 1/2"-2" Pressure Type Vacuum Breaker, Apr. 2002, Conbraco Industries, Inc., Matthews, North Carolina 28106, 6 pages.

* cited by examiner

APPARATUS AND METHOD FOR VALVE CARTRIDGE EXTRACTION

FIELD OF THE DISCLOSURE

The present disclosure relates to a valve cartridge extraction tool and, more specifically, to a valve including the valve cartridge extraction tool.

BACKGROUND

Backflow prevention valves are used to protect against back-siphonage into a potable water supply in a wide variety of applications such as in industrial plants, laboratories, laundries, swimming pools, lawn sprinkler systems and the like. During servicing, inspection or testing, internal components, such as a check valve cartridge, of the valve may need to be replaced. However, the internal components may be difficult to remove by hand. There is, therefore, a need for a solution to easily remove internal components from an installed valve.

SUMMARY

In view of the above, an apparatus and method to remove the cartridge from a valve with relative ease and without the need for additional tools is disclosed herein. In one aspect of the present disclosure, a removal tool is a component of the valve and can be used to facilitate the relatively easy removal of the cartridge without the need for any additional tools.

One aspect of the present disclosure presents a valve assembly comprising a valve member body with an opening defined through the valve member body, a cartridge configured to fit into the valve member body through the opening, and an extraction tool with one or more pins defined on an upper surface, the tool configured to couple the cartridge to the valve member body and wherein the pins are configured to engage the cartridge to aid in coupling and decoupling the cartridge and the body.

Another aspect of the present disclosure presents a water control device comprising a member body defining a flow path extending between an inlet and an outlet, a port defined in the member body and extending into the flow path, a component lodged in the port, and an extraction tool removably secured to the member body to retain the component in the port, the tool including one or more pins, each pin having a free distal end configured to interact with the component. The extraction tool can be unsecured from the member body and the one or more pins then used to dislodge the component from the port.

Another aspect of the present disclosure includes an extraction tool comprising a hollow cylindrical body having an upper surface, a cylindrical outer sidewall, and an inner surface, one or more pins perpendicularly disposed on the upper surface of the body, each pin having a free distal end configured to interact with a cartridge, and one or more outward protrusions extending from the cylindrical outer sidewall, wherein each protrusion corresponds to a respective pin.

A further aspect of the present disclosure presents a method of removing a valve cartridge from a valve assembly, wherein the valve assembly comprises a valve member body with an opening, the valve cartridge disposed in the opening, a valve cartridge extraction tool, comprising one or more pins defined on an upper surface of the tool, and coupled to the valve member body to maintain the cartridge in the opening. The method of removing the valve cartridge from the valve assembly comprises uncoupling the tool from the valve member body, coupling the one or more pins to the cartridge, rotating the cartridge with the extraction tool to uncouple the cartridge from the valve member body, and removing the uncoupled cartridge.

BRIEF DESCRIPTION OF THE DRAWINGS

Various aspects of the present disclosure are discussed herein with reference to the accompanying Figures. It will be appreciated that, for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended as a definition of the limits of the disclosure.

DETAILED DESCRIPTION

Aspects of the present disclosure overcome many of the known problems associated with cartridge removal in a valve assembly. These advantages, and other features of the technology disclosed herein, will become more readily apparent to those having ordinary skill in the art from the following detailed description of certain exemplary embodiments taken in combination with the drawings. It should be noted that directional indications such as vertical, horizontal, upward, downward, right, left, top, bottom and the like, are used with respect to the figures and not meant in a limiting manner.

Figure 1A:
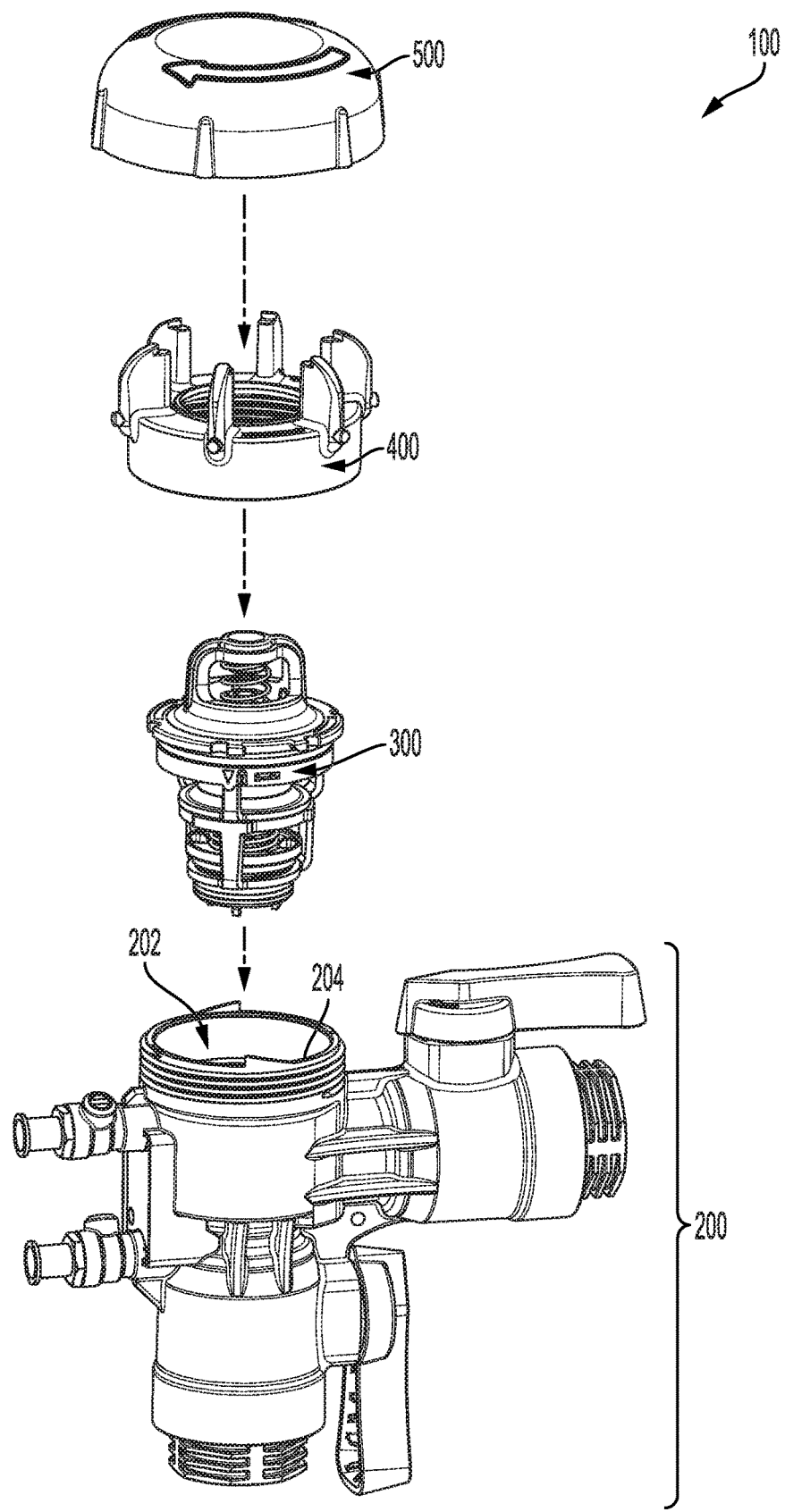
FIG. 1A is an exploded view of a pressure vacuum breaker (PVB) assembly in accordance with an aspect of the present disclosure.
Figure 1B:
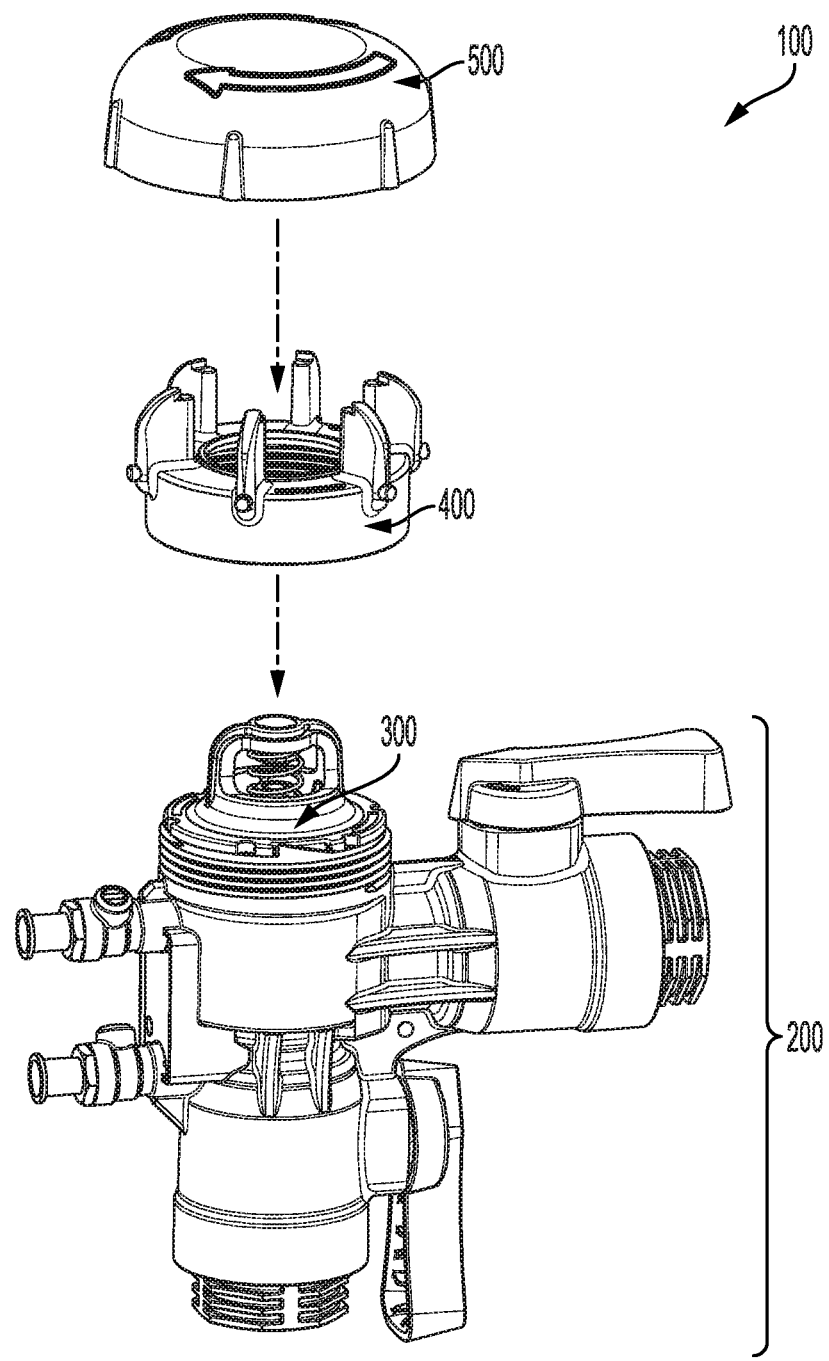
FIG. 1B is an exploded view of the PVB assembly of FIG. 1A with a cartridge loaded in a valve member body in accordance with an aspect of the present disclosure.

Referring now to FIGS. 1A and 1B, a valve assembly 100 comprises a valve member body 200, a cartridge 300, a valve cartridge extraction (VCE) tool 400, and a hood 500. In the exemplary embodiment shown, the valve assembly 100 comprises a pressure vacuum breaker (PVB) type backflow prevention valve. However, it should be understood that the VCE tool can be applied to different types of water control devices such as backflow valves, pressure regulating valves, strainers, filters, and other devices having internal components that can be removed and/or replaced during servicing, inspection or testing. A PVB valve is described in detail in U.S. Pat. No. 9,546,475, which is incorporated herein by reference in its entirety.

Figure 2A:
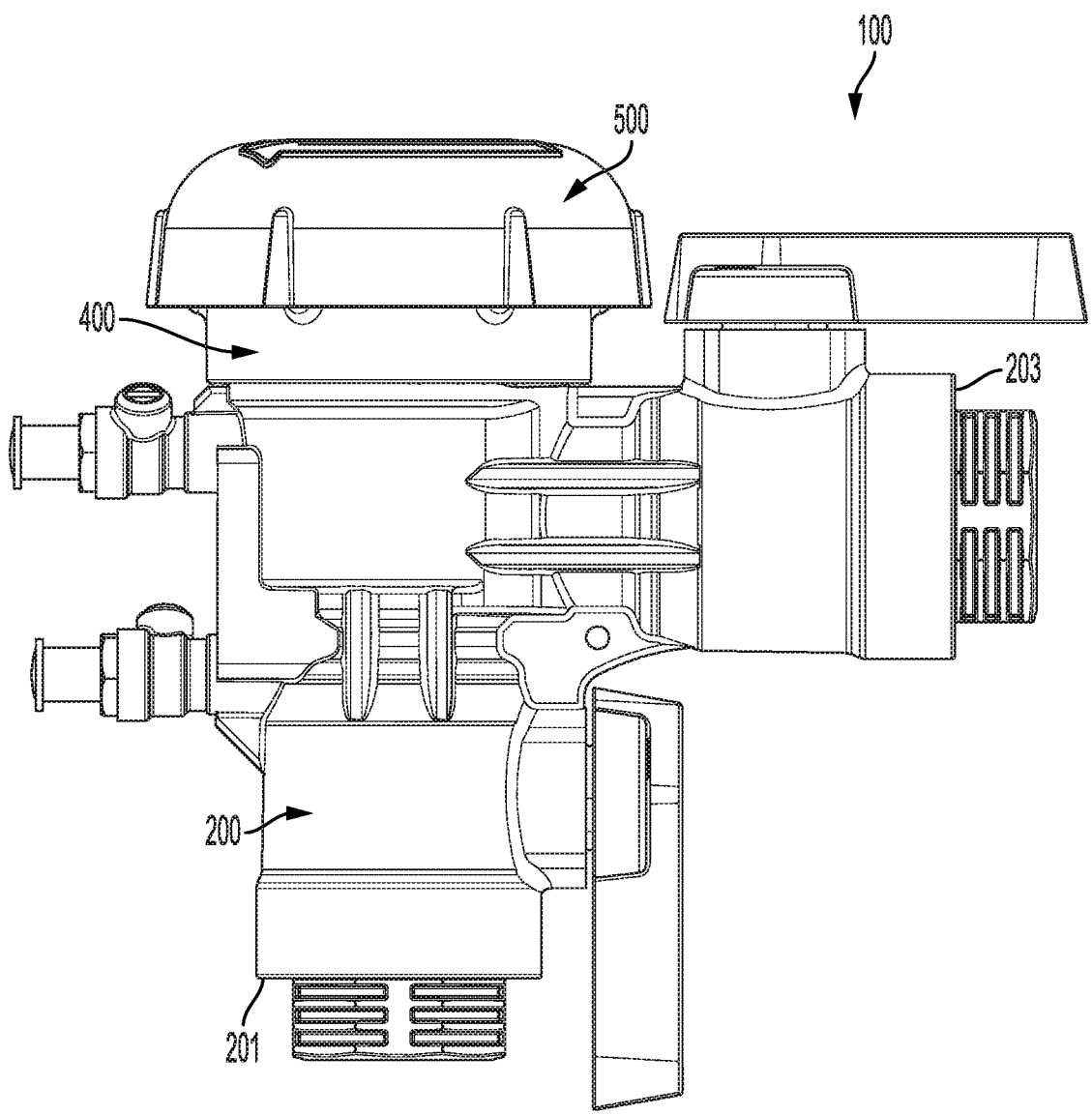
FIG. 2A is an elevation view of the fully assembled PVB assembly of FIG. 1A in accordance with an aspect of the present disclosure.
Figure 2B:
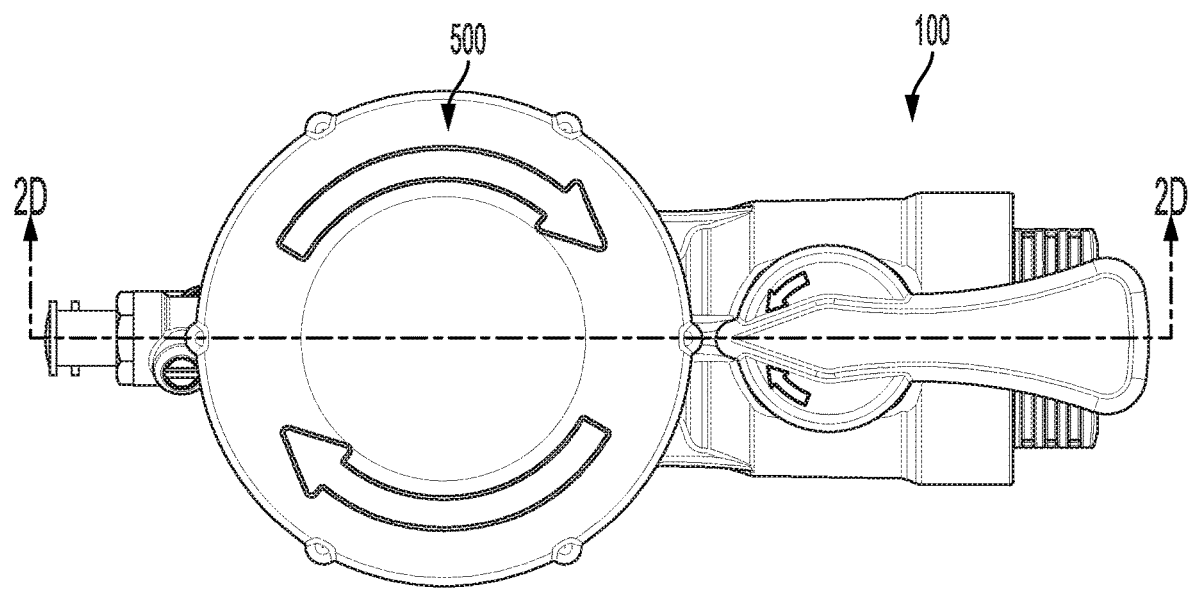
FIG. 2B is a top plan view of the fully assembled PVB assembly of FIG. 1A.
Figure 2C:
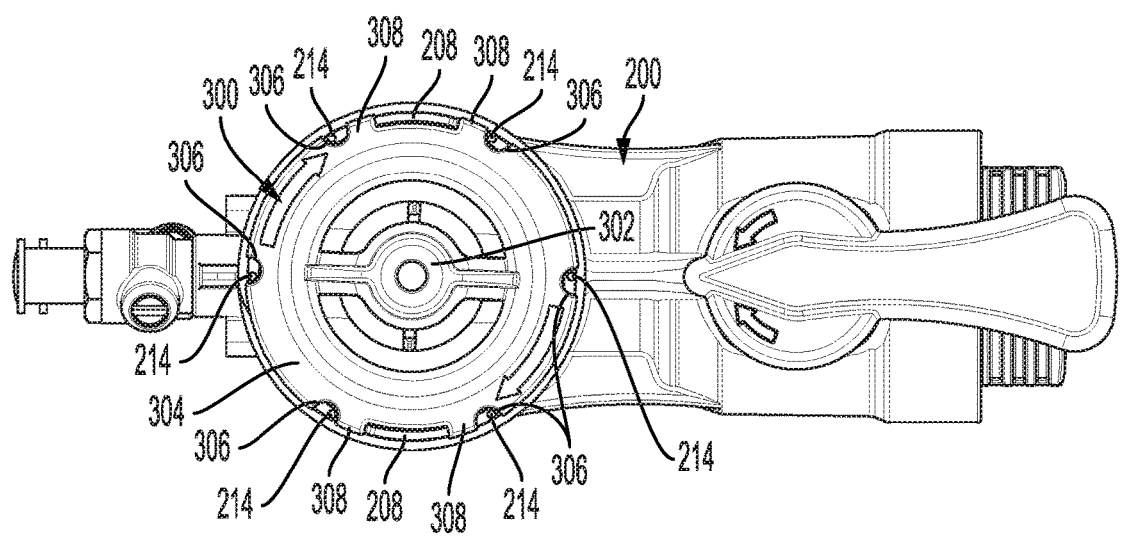
FIG. 2C is a top plan view of the PVB assembly of FIG. 1A shown with a valve cartridge extraction (VCE) tool and a hood removed.
Figure 2D:
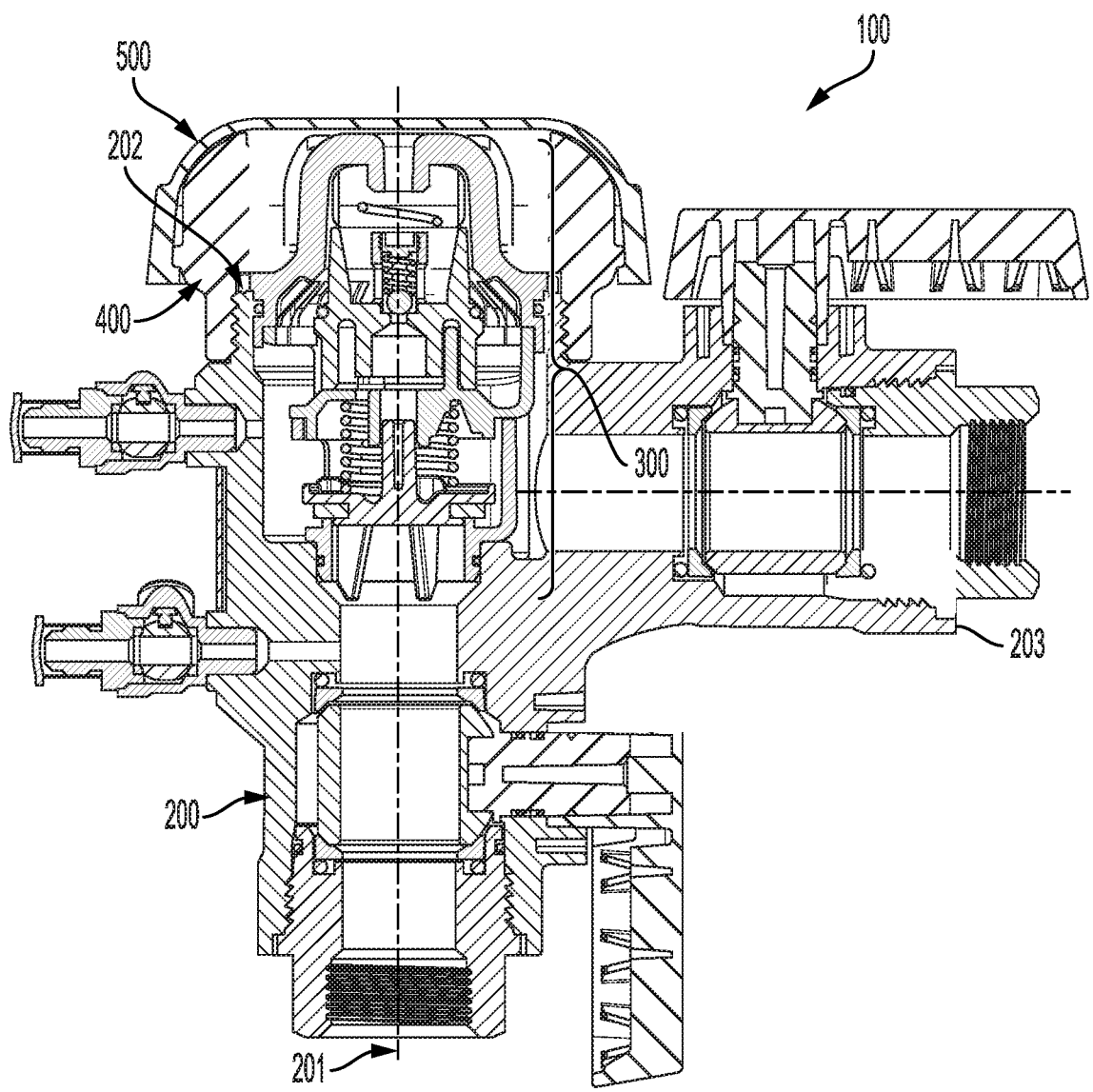
FIG. 2D is a sectional view of the fully assembled PVB assembly of FIG. 1A taken along line 2D-2D of FIG. 2B.
Figure 2E:
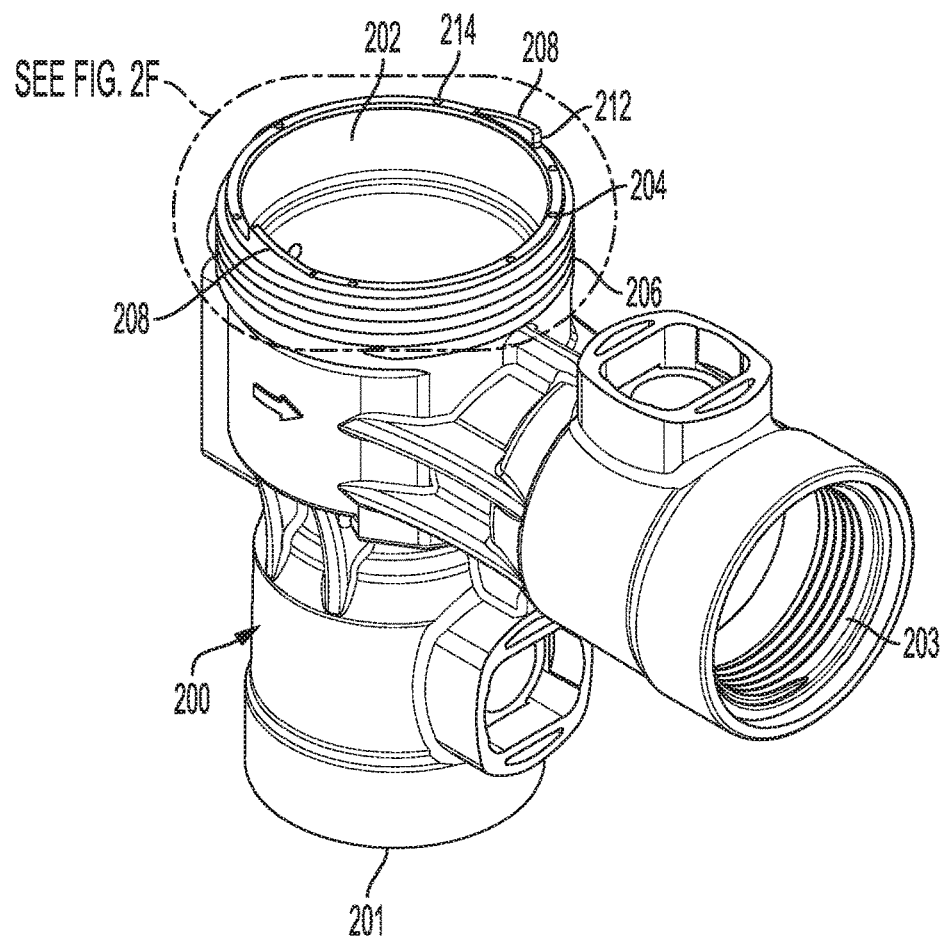
FIG. 2E is a perspective view of a valve member body of the PVB assembly of FIG. 1A.
Figure 2F:
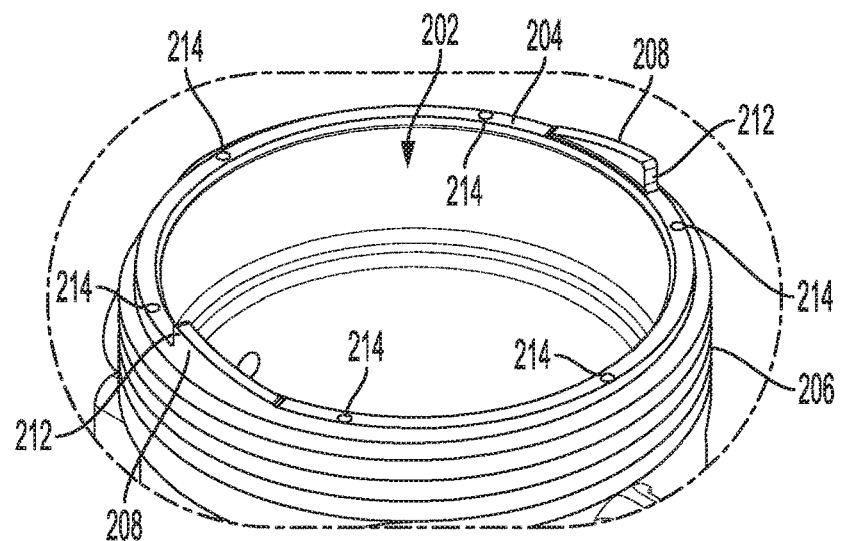
FIG. 2F is an enlarged view of a portion of the body contained in circle 2F of FIG. 2E.

Referring also to FIGS. 2E and 2F, the valve member body 200 includes a cartridge loading port 202. An upper surface 204 is provided about the loading port 202 and a plurality of ramps 208, with each ramp 208 having a vertical sidewall 212, are disposed about the upper surface 204. Also disposed about the upper surface 204 are a number of alignment aids, e.g., multiple dimples 214.

The cartridge 300 is inserted into the cartridge loading port 202. Although not specifically shown, the cartridge 300 contains a valve member which allows water flow in only a single direction, similar to a cartridge shown and described in U.S. Pat. No. 9,546,475. The cartridge 300 resides in a flow path of the valve member body 200 and allows water to flow from an inlet 201 of the valve member body 200 through the flow path to an outlet 203 but does not allow reverse flow. O-rings or other seals are provided between the cartridge 300 and the body 200 to provide a fluid tight seal. Because of the O-rings, the cartridge 300 fits tightly within the body 200 such that insertion and removal is aided by the VCE tool 400.

The VCE tool 400 is placed over the cartridge 300 and is coupled, e.g., screwed down onto the valve member body 200, restraining the cartridge 300 in the valve member body 200. The hood 500 is then coupled onto the VCE tool 400 resulting in the fully assembled valve assembly 100 as shown in FIGS. 2A, 2B and 2D.

Figure 3A:
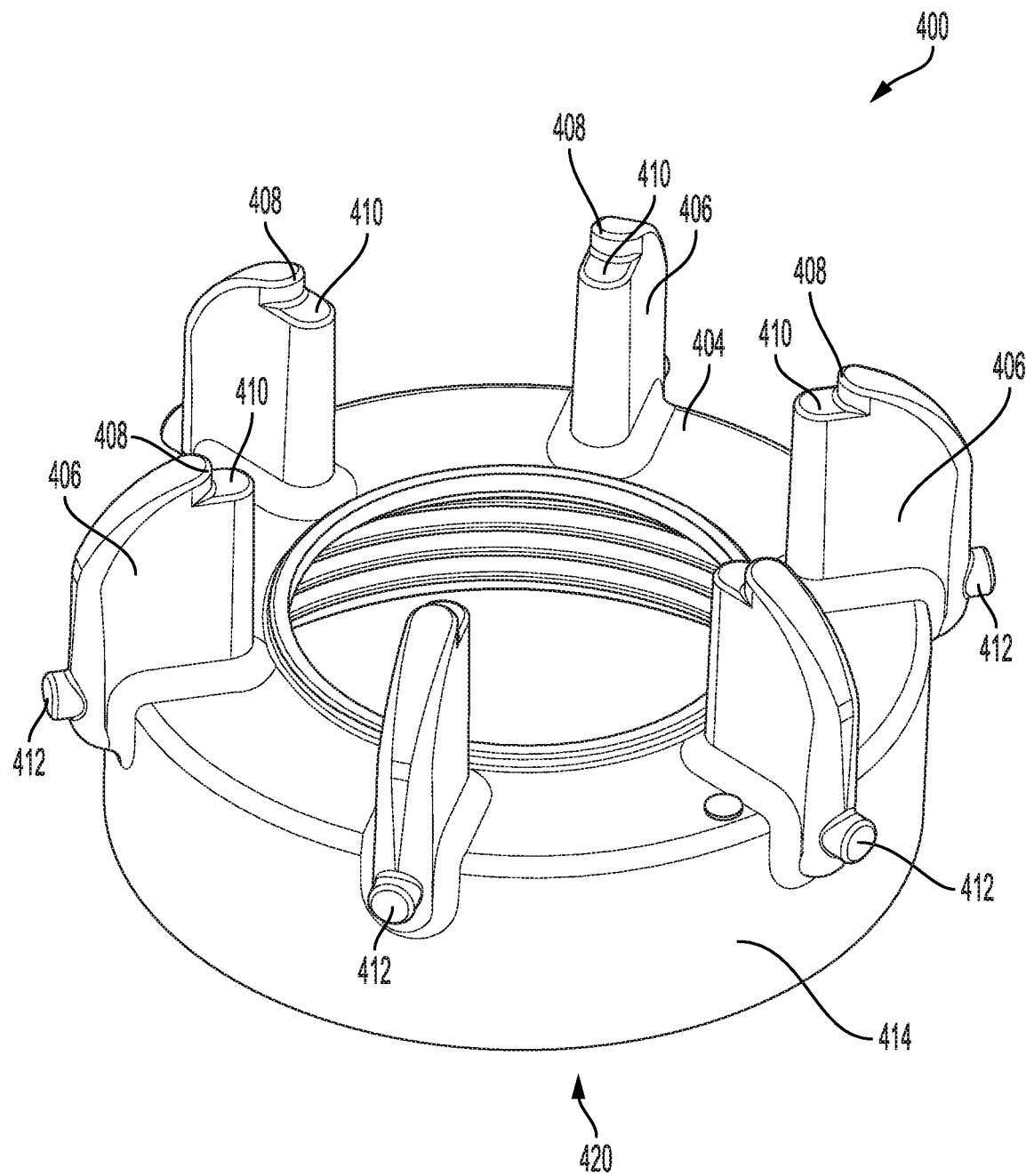
FIG. 3A is a perspective view of a valve cartridge extraction (VCE) tool in accordance with an aspect of the present disclosure.

Referring now to FIG. 3A, the VCE tool 400 has a body 420 with a cylindrical outer sidewall 414, an upper surface 404, and an opening 402 running through the body 420 of the VCE tool 400. A plurality of pins 406 are disposed circumferentially on the upper surface 404 surrounding the opening 402. In one exemplary embodiment, as shown, six pins 406 are provided, however, aspects of the present disclosure are not limited to this number of pins 406. Each pin 406 has a free distal end 408 with a distal notch 410 defined therein. In the embodiment shown in FIG. 3A, a plurality of outward protrusions 412 are disposed along the cylindrical outer sidewall 414, aligning respectively, with the pins 406. In other words, one protrusion 412 is present for each pin 406.

Figure 3B:
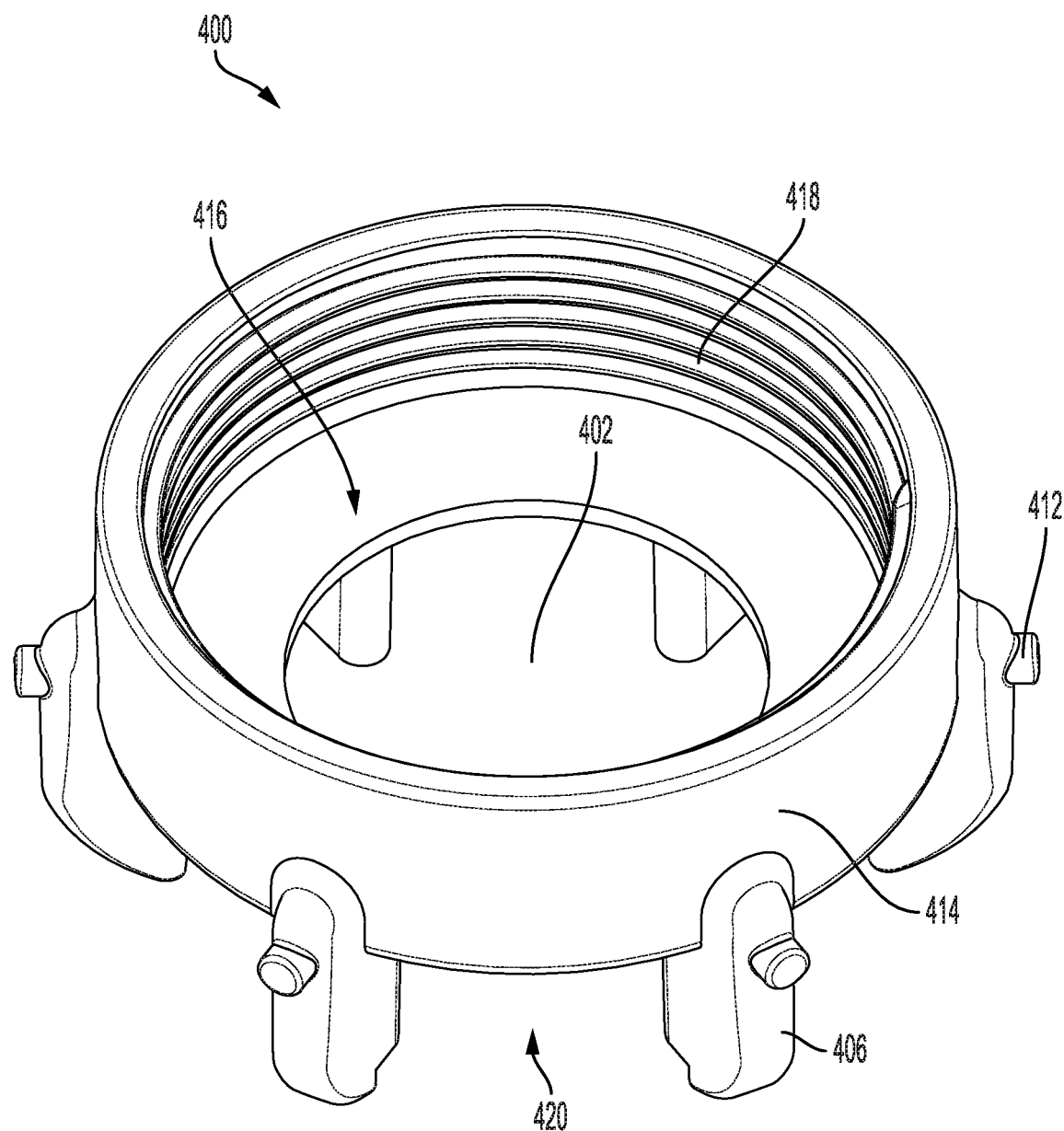
FIG. 3B is another perspective view of the VCE tool of FIG. 3A in accordance with an aspect of the present disclosure.

Referring now to FIG. 3B, the body 420 has a recessed bottom surface 416 and an interior threaded surface 418 for coupling with threads 206 of the valve member body 200. When the interior threaded surface 418 of the VCE tool 400 is coupled with the threads 206 of the valve member body 200, the cartridge 300 is restrained in place in the valve member body 200 as was described above.

Figure 4:
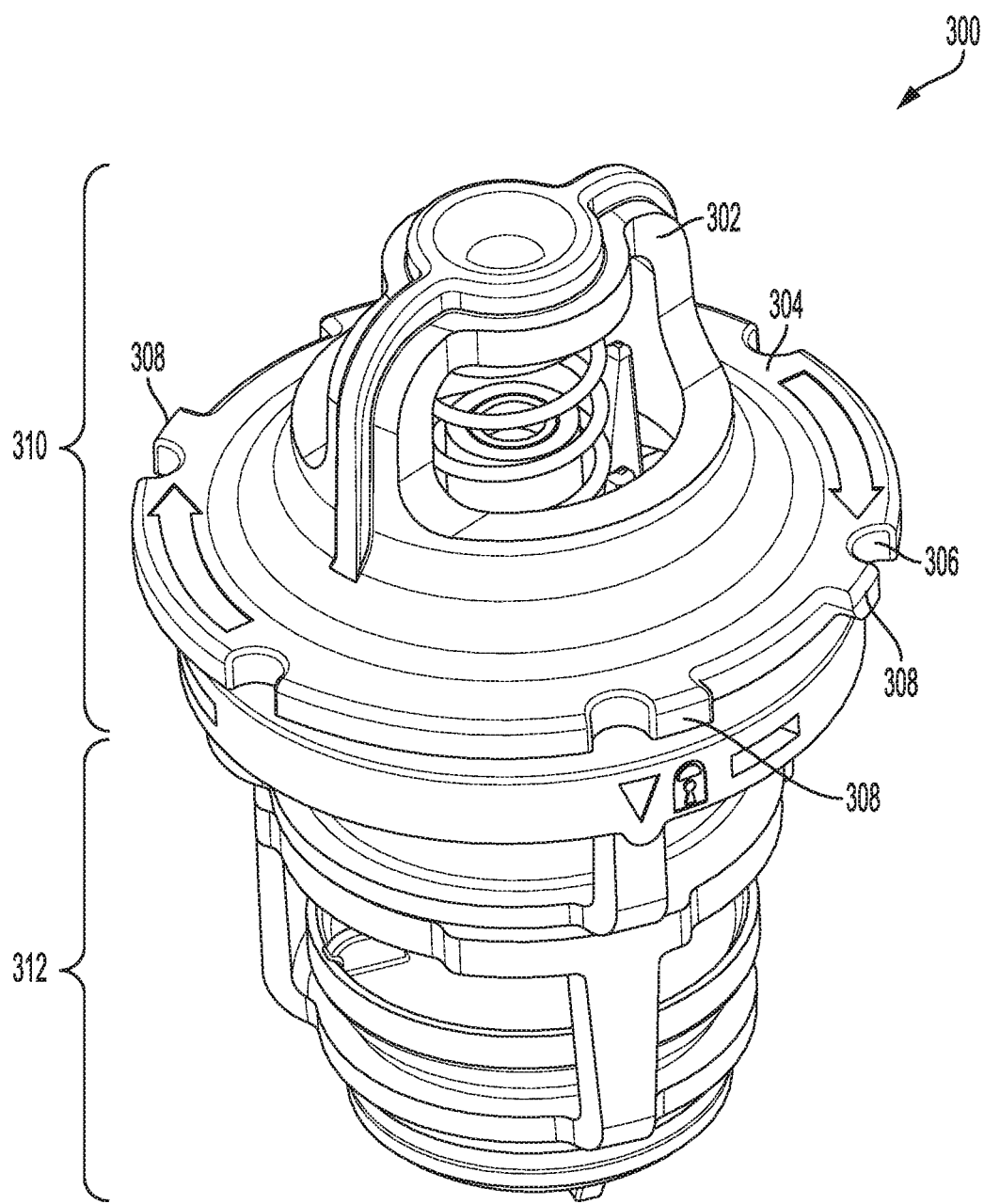
FIG. 4 is a perspective view of a cartridge in accordance with an aspect of the present disclosure.

As shown in FIG. 4, the cartridge 300 has a proximal portion 310 and a distal portion 312. The proximal portion 310 of the cartridge has a bonnet 302 that covers a portion of the mechanics of the cartridge 300. The opening 402 in the VCE tool 400 (shown in FIGS. 3A and 3B) is sized to accommodate the bonnet 302. The proximal portion 310 has a base 304 to rest on the upper surface 204 of a cartridge loading port 202 (shown in FIG. 1A) of the valve member body 200 when the cartridge 300 is positioned in the valve member body 200. The base 304 has a plurality of notches 306 for interacting, respectively, with the distal notches 410 of the pins 406 in the VCE tool 400 during the removal of the cartridge 300, as will be discussed below in more detail. As shown in FIG. 2C, when the cartridge 300 is properly positioned in the body 200, the notches 306 align with the alignment aids 214 of the body 200. The base 304 also has a plurality of projections 308 for locking against the vertical sidewalls 212 of the plurality of ramps 208 disposed on the upper surface 204 of the cartridge loading port 202 to position the cartridge 300 in the cartridge loading port 202.

In the exemplary embodiment shown, the valve assembly 100 includes a hood 500 that is secured to and covers the VCE tool 400. However, it should be understood that a hood is not required in all applications, as the valve assembly, or other types of water control devices, may need not include the hood on the VCE tool 400.

Figure 5A:
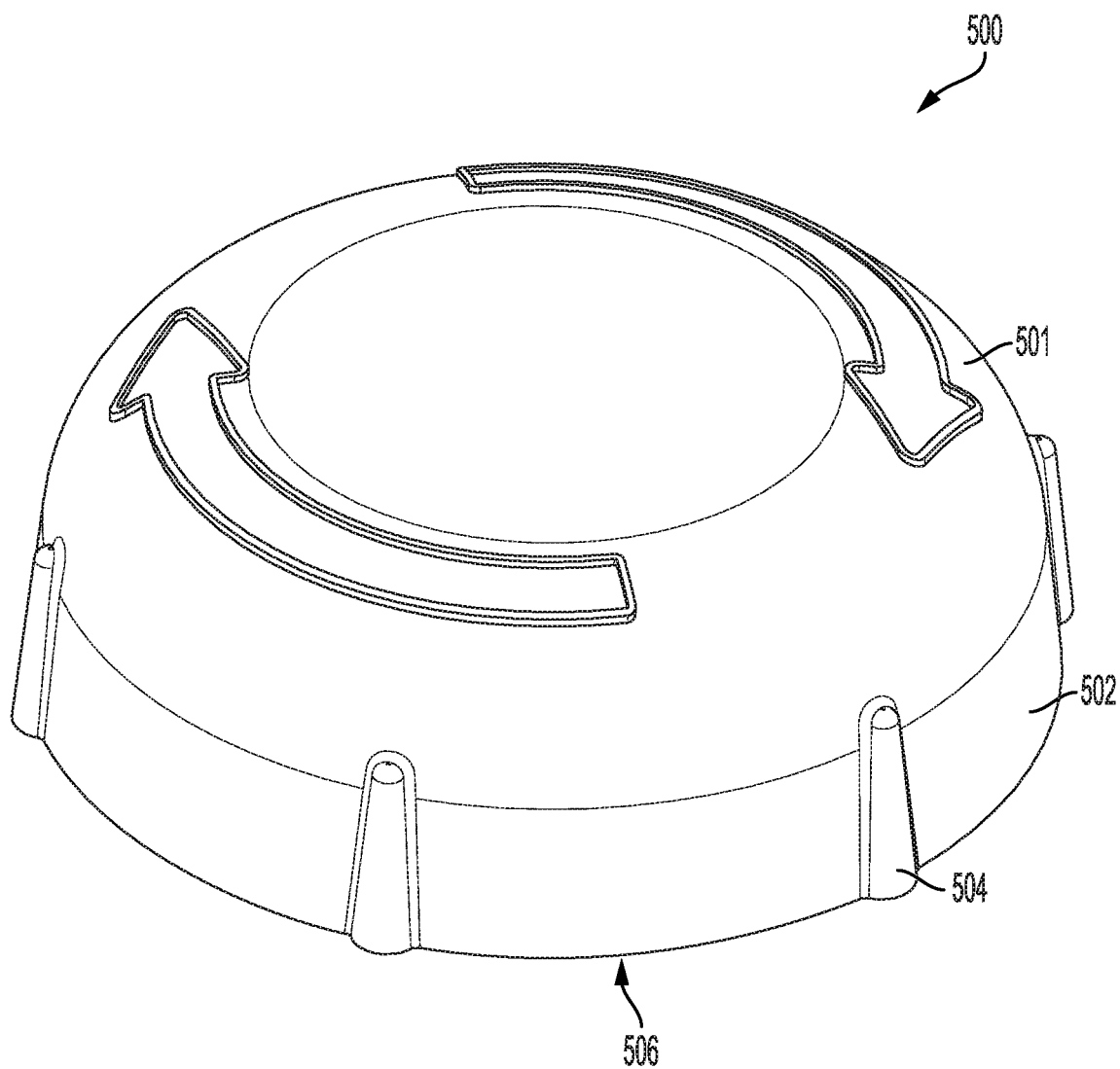
FIG. 5A is a perspective view of a hood in accordance with an aspect of the present disclosure.
Figure 5B:
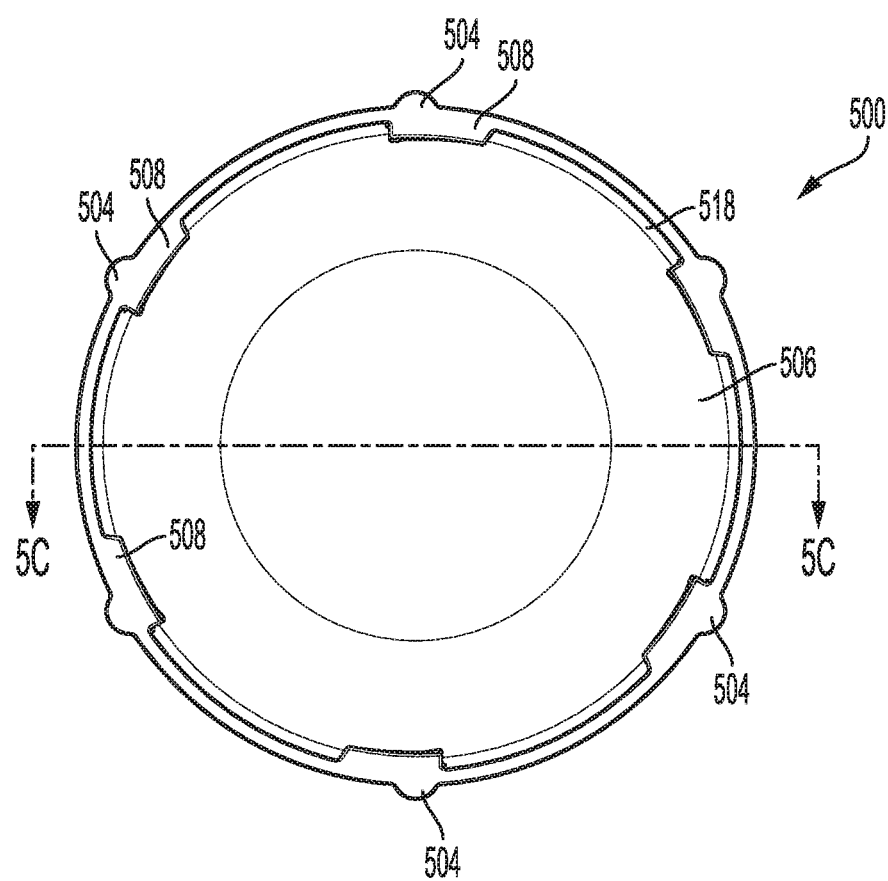
FIG. 5B is a plan view of the hood of FIG. 5A in accordance with an aspect of the present disclosure.
Figure 5C:
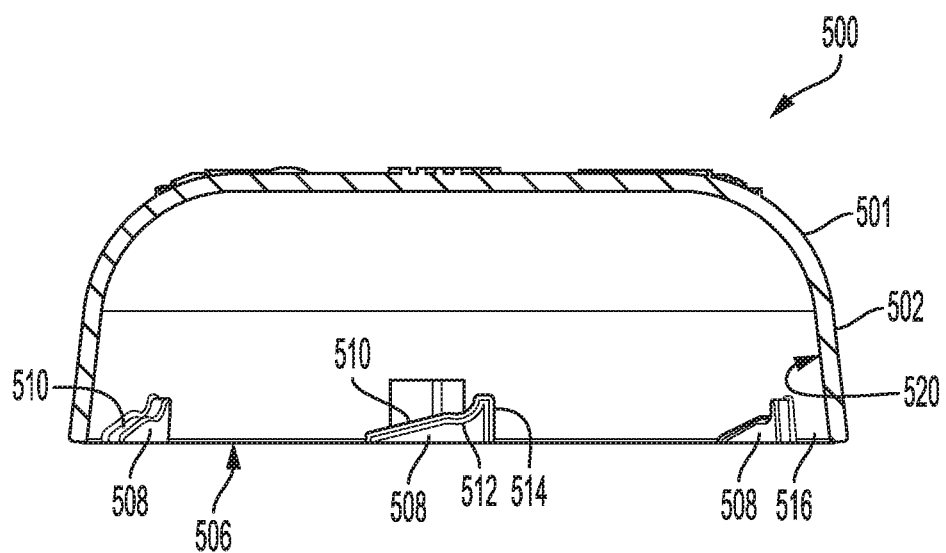
FIG. 5C is a sectional view of the hood of FIG. 5A taken along line 5C-5C of FIG. 5B.

Referring now to FIG. 5A, the hood 500 comprises a generally circular body 501 with an outer sidewall 502 and a plurality of grip features 504 disposed about the outer sidewall 502. The hood 500 also comprises a recessed bottom region 506. As shown in FIG. 5B, a plurality of ramps 508 are disposed along an interior surface 520 of the hood 500. Each ramp 508 interacts with a respective outward protrusion 412 on the VCE tool 400. A plurality of outward protrusion entry points 516 and capture tracks 518 are provided.

In accordance with an aspect of the present disclosure, the hood 500 is placed over the VCE tool 400 such that the outward protrusions 412 of the VCE tool 400 are positioned to enter the corresponding outward protrusion entry points 516. For installation of the hood 500 onto the valve assembly 100, the hood 500 is rotated, e.g., counter clockwise, such that the outward protrusions 412 of the VCE tool 400 move along the capture tracks 518 and travel up along inclines 510 of the ramps 508 until the outward protrusions 412 of the VCE tool 400 rest in respective protrusion seats 512 of the ramps 508. Further travel of an outward protrusion 412 past the protrusion seat 512 is stopped by the vertical stop 514 of the ramp 508, thereby locking the hood 500 in place over the VCE tool 400.

When the outward protrusions 412 of the VCE tool 400 rest in respective protrusion seats 512 of the ramps 508, the hood 500 is maintained in tension against the VCE tool 400 such that a force is required to rotate the hood 500 in an opposite direction to back the protrusions 412 out of the seats 512. In one exemplary embodiment, the hood 500 can be rotated and removed from the VCE tool 400 by hand.

For the removal of the hood 500 from the valve assembly 100, the hood 500 is rotated in the opposite direction as compared to installation, e.g., clockwise, such that the outward protrusions 412 are displaced from the protrusion seats 512 and moved down the inclines 510 of the ramps 508. Once the protrusions 412 have travelled down the inclines 510 of the ramps 508, the hood 500 can be removed.

Figure 6A:
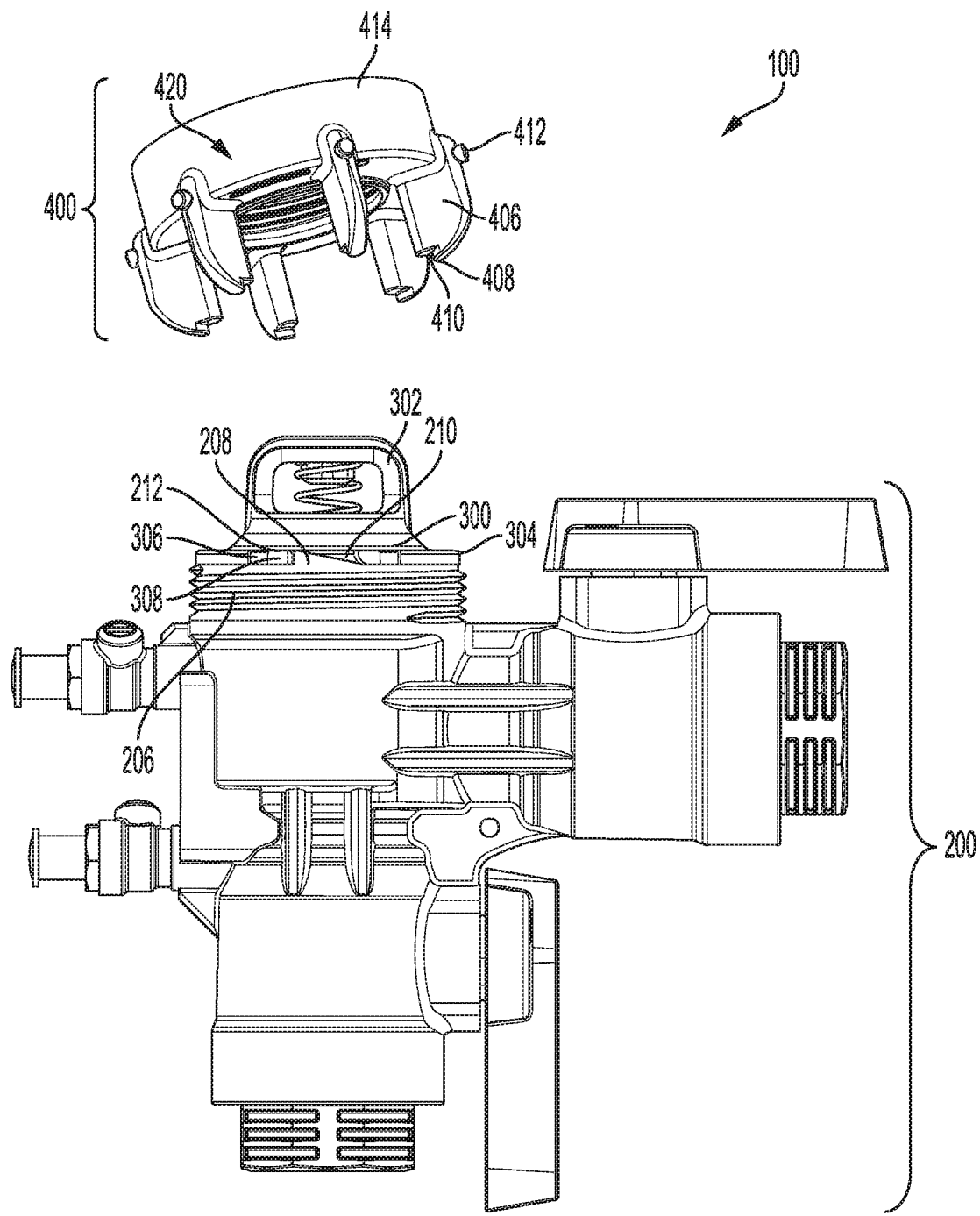
FIG. 6A is an exploded view of the PVB assembly of FIG. 1B with the VCE tool inverted for the cartridge removal in accordance with an aspect of the present disclosure.
Figure 6B:
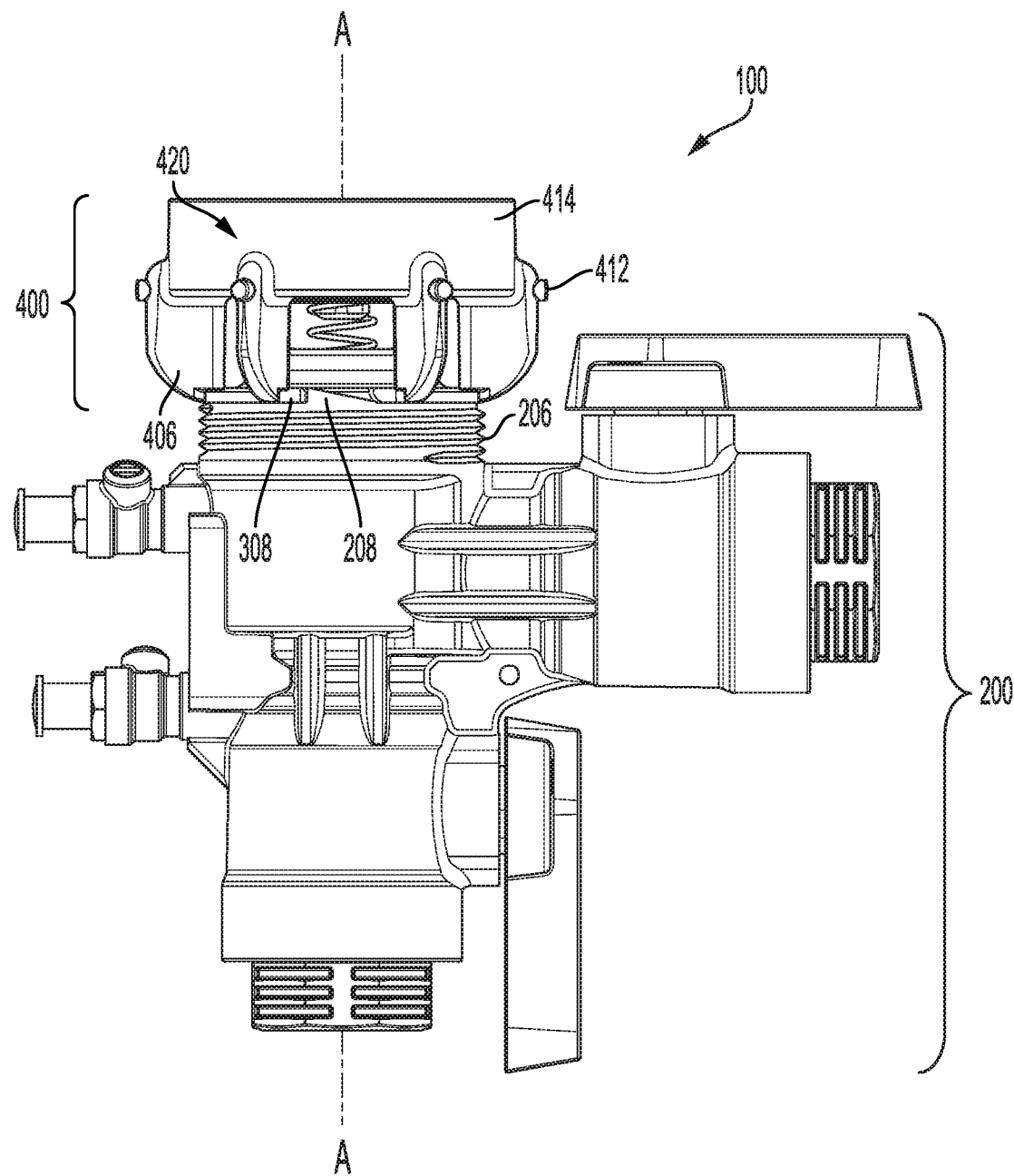
FIG. 6B is a plan view of the PVB assembly of FIG. 6A with the inverted VCE tool coupled to the cartridge for cartridge removal in accordance with an aspect of the present disclosure.

In one aspect of the present disclosure, a method of removing the cartridge 300 is provided. Referring now to FIGS. 6A and 6B, when the cartridge 300 is to be removed from the PVB assembly 100 (as shown in FIG. 2), the hood 500 is removed from the VCE tool 400 and the VCE tool 400 is uncoupled, i.e., unscrewed, from the valve member body 200. The uncoupled VCE tool 400 is then positioned such than the distal notches 410 of the pins 406 of the VCE tool 400 couple to the respective notches 306 on the base 304 of the proximal portion 310 of the cartridge 300. The VCE tool 400 is then rotated, i.e., clockwise, about an axis "A", while coupled to the cartridge 300, that is, the projections 308 of the base 304 of the proximal portion of the cartridge move along the inclines 210 of the ramps 208 disposed on the upper surface 204 of the cartridge loading port 202, facilitating removal of the cartridge 300 from the cartridge loading port 202.

In another embodiment of the present disclosure, the VCE tool 400 has a closed upper surface in that it does not comprise the opening 402 defined on the upper surface 404. In this instance, the cylindrical outer sidewalls 414 of the VCE tool 400 are elongated to accommodate other components, e.g., the bonnet 302 of the cartridge 300.

Advantageously, the VCE tool provides additional torque and leverage in the installation/removal of the cartridge from the valve member body when compared to "finger-strength" installation/removal of the cartridge. The VCE tool being a part of the valve assembly eliminates the need for a separate tool for cartridge removal. Additionally, having a single part with two functions reduces the costs associated with servicing the system.

It should be appreciated that aspects of the subject technology can be implemented and utilized in numerous ways including, without limitation, as an apparatus, a system, a device, and a method for applications now known and later developed. Further, the functions of several elements may, in alternative embodiments, be carried out by fewer elements, or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to various embodiments, those skilled in the art will readily appreciate that various changes and/or modifications can be made to the subject technology without departing from the scope of the present disclosure.

What is claimed is:

1. A valve assembly, comprising:
a valve member body with an opening defined therethrough;
a cartridge configured to fit into the valve member body through the opening; and
an extraction tool with one or more pins defined on an upper surface, the extraction tool configured to couple the cartridge to the valve member body,
wherein the pins are configured to engage the cartridge to aid in coupling and decoupling the cartridge and the valve member body.

2. The valve assembly of claim 1, wherein:
the upper surface of the extraction tool is circular, and
the one or more pins are arranged about a circumference of the upper surface.

3. The valve assembly of claim 2, wherein the one or more pins are equally spaced from one another about the circumference of the upper surface of the extraction tool.

4. The valve assembly of claim 2, wherein the extraction tool is adapted to be turned over and pointed downward after removal from the body to allow the one or more pins to engage the cartridge.

5. The valve assembly of claim 1, wherein the one or more pins of the extraction tool include a distal notch defined at a free distal end of the one or more pins.

6. The valve assembly of claim 1, further comprising a hood coupled to the extraction tool.

7. The valve assembly of claim 1, wherein the extraction tool comprises one or more outward protrusions.

8. The valve assembly of claim 7, further comprising a hood removably secured to the extraction tool with the protrusions.

9. The valve assembly of claim 7, wherein the hood includes protrusion seats for capturing the protrusions of the extraction tool.

10. The valve assembly of claim 1, wherein the valve member body includes ramps for engaging the cartridge.

11. The valve assembly of claim 1, wherein the extraction tool couples the cartridge to the valve member body with screw threads.

12. The valve assembly of claim 1, wherein the valve member body includes alignment aids that align with notches of the cartridge when the cartridge is properly positioned in the valve member body.

13. An extraction tool for removing a cartridge from a valve body, comprising:
a hollow cylindrical body having an upper surface, a cylindrical outer sidewall, and an inner surface;
one or more pins perpendicularly disposed on the upper surface of the body, each pin having a free distal end configured to interact with the cartridge; and
one or more outward protrusions extending from the cylindrical outer sidewall, wherein each protrusion corresponds to a respective pin.

14. The extraction tool of claim 13, wherein: the upper surface is circular, and wherein the pins are arranged about a circumference of the upper surface.

15. The extraction tool of claim 14, wherein the pins are equally spaced from one another about the circumference of the upper surface.

16. The extraction tool of claim 14, wherein: an opening is defined in the upper surface, and wherein the pins are arranged about the opening.

17. The extraction tool of claim 13, wherein each protrusion is perpendicular to the respective pin.

18. The extraction tool of claim 13, wherein each pin comprises a distal notch defined at the free distal end of the pin.

19. The extraction tool of claim 13, wherein the inner surface comprises a threaded surface.

20. A valve assembly comprising:
a valve member body defining:
a inlet port;
an outlet port directed 90 degrees away from the inlet port; and
a loading port disposed between the inlet and outlet port;
a valve cartridge configured for insertion into the loading port of the valve member body such that the valve cartridge resides in a flow path of the valve member body, the valve cartridge defining a plurality of notches on a proximal portion thereof; and
a valve cartridge extraction tool configured to lodge the valve cartridge in the valve member body through the loading port, the valve cartridge extraction tool defining a plurality of pins each having a distal notch, wherein the valve cartridge extraction tool is configured to remove the valve cartridge from the valve member body by coupling the plurality of pins to the plurality of notches of the valve cartridge for rotating the valve cartridge extraction tool.

21. The valve assembly of claim 20, wherein the plurality of pins are equally spaced from one another about a circumference of an upper surface of the valve cartridge extraction tool.

22. The valve assembly of claim 20, further comprising a hood removably coupled to the valve cartridge extraction tool.

23. The valve assembly of claim 22, wherein the hood defines a plurality of internal ramps, each internal ramp configured to interact with one of the plurality of pins of the valve cartridge extraction tool for engagement.

24. The valve assembly of claim 20, wherein the valve cartridge extraction tool is configured for securement to the loading port of the valve member body.

25. A valve assembly comprising:
a right-angled valve member defining a flow path extending between an inlet and an outlet;
a port defined in the right-angled valve member and extending into the flow path;
a cartridge lodged in the port; and
an extraction tool configured to input the cartridge in the port, the extraction tool including one or more pins, each pin having a free distal end configured to interact with the cartridge, wherein the one or more pins of the extraction tool can be used to dislodge the cartridge from the port.

26. The valve assembly of claim 25, wherein the one or more pins am equally spaced from one another about a circumference of an upper surface of the extraction tool.

27. The valve assembly of claim 25, further comprising a hood removably coupled to the extraction tool.

28. The valve assembly of claim 27, wherein the hood defines a plurality of internal ramps, each internal ramp configured to interact with one of the plurality of pins of the valve cartridge extraction tool for engagement.

29. The valve assembly of claim 25, wherein the extraction tool is configured for removable securement to the right-angled valve member.

30. A valve assembly comprising:
a valve member body;
a cartridge configured to mount in the valve member body; and
an extraction tool with a plurality of pins, the extraction tool configured to couple the cartridge to the valve member body, wherein the plurality of pins are configured to engage the cartridge to aid in coupling and decoupling the cartridge and the valve member body.

\* \* \* \* \*